United States Patent [19]

Ikeda et al.

[11] Patent Number: 4,468,695

[45] Date of Patent: Aug. 28, 1984

[54] ROBOT

[75] Inventors: Junichi Ikeda, Tokyo; Noriyuki Utsumi; Yukio Otani, both of Yokohama, all of Japan

[73] Assignee: Tokico Ltd., Japan

[21] Appl. No.: 322,375

[22] Filed: Nov. 17, 1981

[30] Foreign Application Priority Data

| Nov. 20, 1980 [JP] | Japan | 55-163731 |
| Nov. 21, 1980 [JP] | Japan | 55-164429 |
| Nov. 21, 1980 [JP] | Japan | 55-164431 |
| Nov. 21, 1980 [JP] | Japan | 55-164432 |

[51] Int. Cl.$^3$ .......................................... H04N 7/18
[52] U.S. Cl. .............................. 358/101; 219/124.22; 219/124.34; 219/125.11
[58] Field of Search ..................... 364/513; 358/101; 219/124.22, 124.34, 125.1, 125.11, 137.31, 137.51, 136; 358/107, 125, 126

[56] References Cited

U.S. PATENT DOCUMENTS 3,171,012  2/1965  Morehead ................ 219/124.34
3,510,626  5/1970  Hasegawa ............... 219/125.11

FOREIGN PATENT DOCUMENTS 2709716  9/1978  Fed. Rep. of Germany ... 219/125.1
2711660  9/1978  Fed. Rep. of Germany ........................ 219/124.22
51-21657  2/1976  Japan .
51-17654  5/1976  Japan .
54-55959  5/1979  Japan .
5570476  5/1980  Japan ............................ 219/124.22
1518244  7/1978  United Kingdom .
1525839  9/1978  United Kingdom .
1534167  11/1978  United Kingdom .
1561256  2/1980  United Kingdom .

OTHER PUBLICATIONS

Kawasaki Vision System–Model 79A, pp. 163-174.

*Primary Examiner*—Joseph A. Orsino, Jr.
*Attorney, Agent, or Firm*—Finnegan, Henderson, Farabow, Garrett & Dunner

[57] ABSTRACT

A robot comprises a platform, a movable arm capable of moving to the platform for operation based on the information prestored in a memory, a working assembly provided movably to an end of the arm, means for detecting the deviation between a position for the working assembly and a position for a portion of a workpiece to be worked and means for displacing the working assembly to the arm so as to compensate the deviation detected by the detection means, and operates accurately.

15 Claims, 21 Drawing Figures

ROBOT

This invention concerns a robot.

An industrial robot of a so-called teaching-playback type adapted to operate based on the previously stored information and having a movable arm comprising a plurality of movable parts and in which a working assembly is secured to the top end of the arm has been known.

Whereupon the industrial robot of such a type is to be operated at high accuracy, for instance, where the robot is applied to the interior working such as sealing for automobiles with the working assembly of the robot being pursued along an aimed working line while in contact with a work, errors may possibly be introduced in the trace of the working assembly of the robot relative to a work, upon playback operation, due to errors between the relative positions of the movable parts in the playback operation and the relative positions of the movable parts in the teaching operation, errors upon positioning of the work and errors in the configuration of the work itself.

A so-called sensor type industrial robot has also been known, in which the relative positions of the working assembly in the robot to a work (deviation) are detected and the positions between each of the movable parts in the movable arm of the robot are corrected in relation to the positions between each of the movable parts which are determined based on the previously stored data for the compensation of the deviation.

However, since it is required in the robot of this type to perform complicated calculations for determining the correction position of the arm having a plurality degrees of freedom (so-called coordinate conversion), it takes much time for the positional control of the robot, as well as such a correction displaces the positions between each of the movable parts in the robot arm from the teaching position, sometime making it difficult for smooth playback of the arm.

In the sensor type robot, it has been known to employ an optical cutting method and using a video signal processing device in order to detect the unevenness on the surface of a work. In the video signal processing device utilized to far for the sensor type robot, it has been adapted to project the images of a slit on the inspected surface containing the portion to be worked, photograph the inspected surface containing slit images thereon deformed depending on the configuration of the surface, convert the bright and dark pattern on the surface as an object to be photographed into video signals through image sensors, digitalize the video signals into bright and dark binary levels to store them into a memory unit and process the memorized data in an electronic computer to thereby determine the configuration of the surface to be inspected.

In the image processing device for this conventional sensor type industrial robot, the bright and dark pattern in each of the divided regions on the inspected surface within a camera view is binarized and stored once in the memory unit as it is. Thus, in the case where one image, that is, one video image is divided into 256 sections in longitudinal and lateral direction respectively, memory regions as many as 8192 bytes (65536 bits) are required for one video image, which considerably increases the cost. Further, in order to determine the configuration of the inspected surface, since 256 times of determinations are necessary for the central position in the lateral (horizontal) direction of the slit images from the stored data for one image (corresponding to the number of divided regions in the longutidinal, i.e., the vertical direction, that is, to the resolution of the device for the configuration of the inspected surface), it takes more than about 0.1 sec. of processing time in a micro-computer utilizing usual processor such as Intel 8080 and Motorola 6800. In addition, a further time is necessary for judging whether the working assembly of the robot is adequately and accurately positioned to a portion to be worked on the inspected surface and for positioning the assembly to that position if there is a deviation between them.

Since the space in the car body of an automobile is complicated and narrow, it is difficult to dispose and operate a robot for the interior work therefor, and this brings about a trouble in the automation of the automobile production. Although it is required for the interior work to open the door mounted to a car body and bring the rotational center of the robot as close as possible to the car body, this is difficult in usual robots, for example, such a robot in which a selfrunning device is disposed in parallel with a car body conveyor in view of the relative position for the robot main body, car body and the door to each other.

An object of this invention is to provide an industrial robot capable of operating at a relatively high speed and with high accuracy.

The above object can be attained by an industrial robot comprising a platform, a movable arm capable of moving to the platform for operation based on the information prestored in a memory stored, a working assembly provided movably to an end of the arm, means for detecting the deviation between a position for the working assembly and a position for a portion of a workpiece to be worked and means for displacing the working assembly to the arm so as to compensate the deviation detected by the detection means.

Another object of this invention is to provide an industrial robot capable of operating at high accuracy, having high operating speed and with reduced memory capacity.

The above object can be attained by an industrial robot, in which the detection means for the deviation comprises a slit image projector for projecting slit images on the portion to be worked, an image pick-up means for repeatedly picking-up the slit images on the portion to be worked and delivering composite video signals on every slit images thus picked-up and a video signal processing device for processing the composite video signals to detect the deviation between the position for the working assembly and the position for the portion to be worked and delivering a signal indicating the deviation, and in which the video signal processing device comprises a synchronization separation circuit for separating the composite video signals into video signals, horizontal synchronization signals and vertical synchronization signals, and for delivering the separated signals, a binarization circuit for converting the video signals into binary signals of high and low levels depending on the luminous information contained in the video signals thus separated, a first counting circuit which is reset at least by one of the signals of the horizontal synchronization signals and the vertical synchronization signals and counts the number of clock signals, a second counting circuit which is reset by the vertical synchronization signals and counts the number of the horizontal synchronization signals, a register for storing the contents in the first counting circuit upon generation of a leading edge in the binary signal from the binarization circuit, an addition circuit for adding the contents in the first counting circuit upon generation of a trailing edge in the binary signal from the binarization circuit and the contents in the register and a memory circuit for storing the data corresponding to the summed data calculated in the addition circuit into the address corresponding to the contents in the second counting circuit.

A further object of this invention is to provide an industrial robot capable of carrying out reliable sealing operation.

The above object can be attained by an industrial robot, in which the working assembly comprises a holder member provided movably to the end of the arm, a movable shaft movably mounted to the holder member in the axial direction of the shaft, a coil spring secured at one end thereof to an end of the movable shaft and having a flexibility in the direction perpendicular to the movable shaft, a sealing nozzle secured to the other end of the coil spring and a resilient member for biasing the movable shaft toward the nozzle.

A still further object of this invention is to provide an industrial robot capable of working even in a restricted narrow space such as in the interior work of a car body rapidly and with ease.

The above object can be attained by an industrial robot, in which the platform is movable to a support for the workpiece in the direction crossing to the longitudinal axis of the workpiece and the movable arm is rotatably connected to the platform.

This invention is to be described in more details referring to the accompanying drawings, by which the foregoing and other objects, as well as the features of this invention will be made clearer in which.

Figure 1:
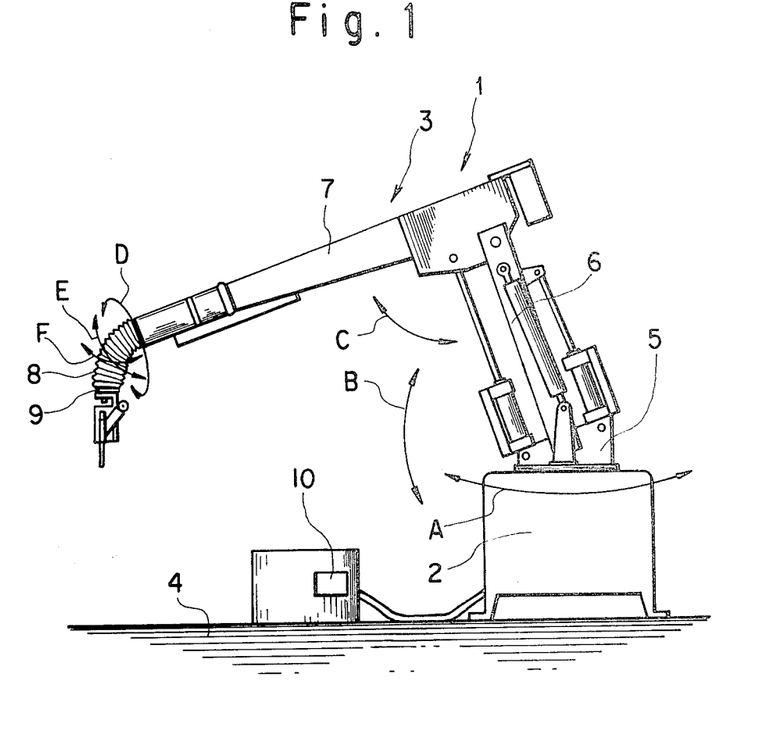
FIG. 1 is an explanatory front view for an industrial robot as a preferred embodiment according to this invention.
Figure 2:
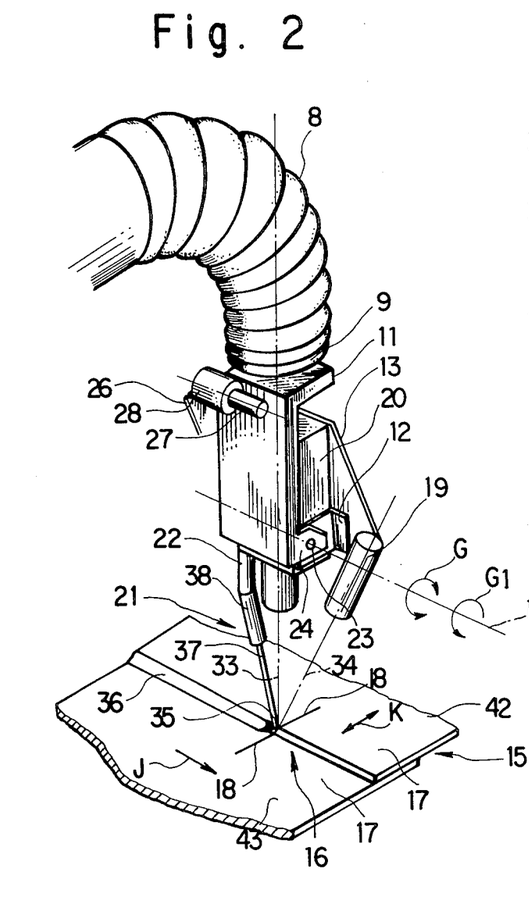
FIG. 2 and FIG. 3 are explanatory views for the working assembly of the robot shown in FIG. 1.
Figure 3:
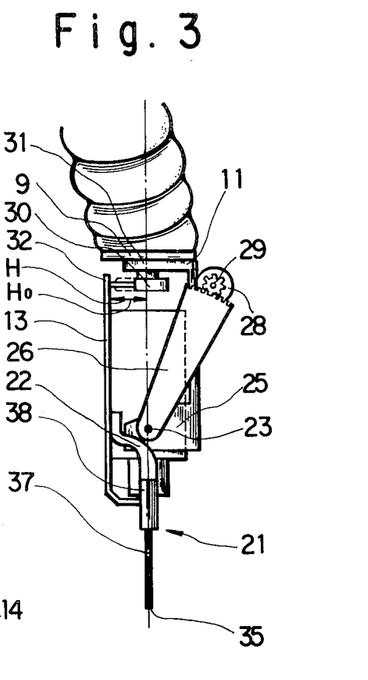

Referring to FIGS. 1 to 3, a robot main body or manipulator 1 comprises a platform or bed 2 and movable arm 3. The platform 2 is held stationary on a floor 4. The movable arm 3 comprises a disk 5 rotatable to the platform 2 in the direction A, a first arm part 6 rotatable to the disk 5 in direction B, a second arm part 7 rotatable to the first arm part 6 in the direction C, and a wrist 8 of a so-called elephant nose type whose top end 9 is rotatable to the second arm part 7 in the three directions D, E and F. The positions for the arm 3 of the robot main body 1, that is, the relative position of the disk 5 to the platform 2, the relative position of the first arm part 6 to the disk 5, the relative position of the second arm part 7 to the first arm part 6 and the relative position of the top end 9 of the wrist 8 to the second arm part 7 are sequentially set based on a series of teaching data e previously stored in a memory unit 10.

A bracket 11 is secured to the cylindrical top end 9 of the wrist 8, and another bracket 13 is provided to this bracket 11 by way of a connection member 12 in a rotatable manner around a rotational axis 14 for correction in the direction G. Specifically, the connection member 12 is rotatable relative to the bracket 11 around the axis 14 and the bracket 13 is secured to the connection member 12. To the bracket 13, are secured a slit light source or slit image projector 19 for projecting slit images 18 onto a work surface 17 of a work 15 having uneven joining portion 16, a television camera 20 as an image pick-up means using semiconductor image sensors or the likes for picking-up the slit images 18 on the work surface 17 and the base 22 of a working assembly 21 of the robot main body 1. A rotational shaft 23 used for rotating the bracket 13 to the bracket 11 is secured at its center to the camera 20 and rotatably supported at its both ends to side projections 24, 25 of the bracket 11 respectively. The rotational shaft 23 is further secured at its one end with a sector gear 26, which, in turn, meshes with another gear 29. The gear 29 is integrated with the power shaft of a speed retarder 28 connected to a motor 27 having good responsivity such as a coreless motor and secured to the bracket 11 at the outer housing. Accordingly, the slit light source 19, the camera 20 and the working assembly 21 are rotationally displaced integrally around the axis 14 depending on the rotation of the motor 27. A potentiometer 30, which is provided between the base 31 of the bracket 11 and the free end 32 of the bracket 13 as a means for detecting the relative position of the working assembly to the arm 3, detects the distance H between the center of the base 31 of the bracket 11 and the free end 32 of the bracket 13 (corresponding to the angle of rotation of the motor 27, that is, the angle of rotation of the bracket 13 to the bracket 11 around the axis 14).

The photoreceiving optical axis 33 of the camera 20, that is, the center axis 33 thereof is aligned with the center axis of the cylindrical top end 9 of the wrist 8 and, crosses, in perpendicular to the rotational axis 14. The optical axis 34 of the slit light source 19 crosses obliquely to the optical axis 33 and, preferably, crosses obliquely to the rotational axis 14. The working assembly 21 comprises a sealing nozzle 37 which slightly touches, at its top end 35, the work surface 17 and applies sealer material 36 from the top end 35 to the joining or sealing portion 16 of the work 15, a nozzle holder 38 comprising a resilient member for elastically supporting the nozzle 37 in the direction along the sealing direction J, as well as in the direction perpendicular thereto in a displaceable manner and a rigid connection member 22 for holding the nozzle holder 38 to the bracket 13 in a fixed position. The nozzle holder 38 can absorb some vertical error in the top end 35 upon playback operation. The nozzle 37 is in the same plane as the axes 33, 34 and the top end 35 of the nozzle 37, preferably, approaches closely to the crossing point between the axes 33, 34 and they meet substantially at a same point.

Figures 4, 5:
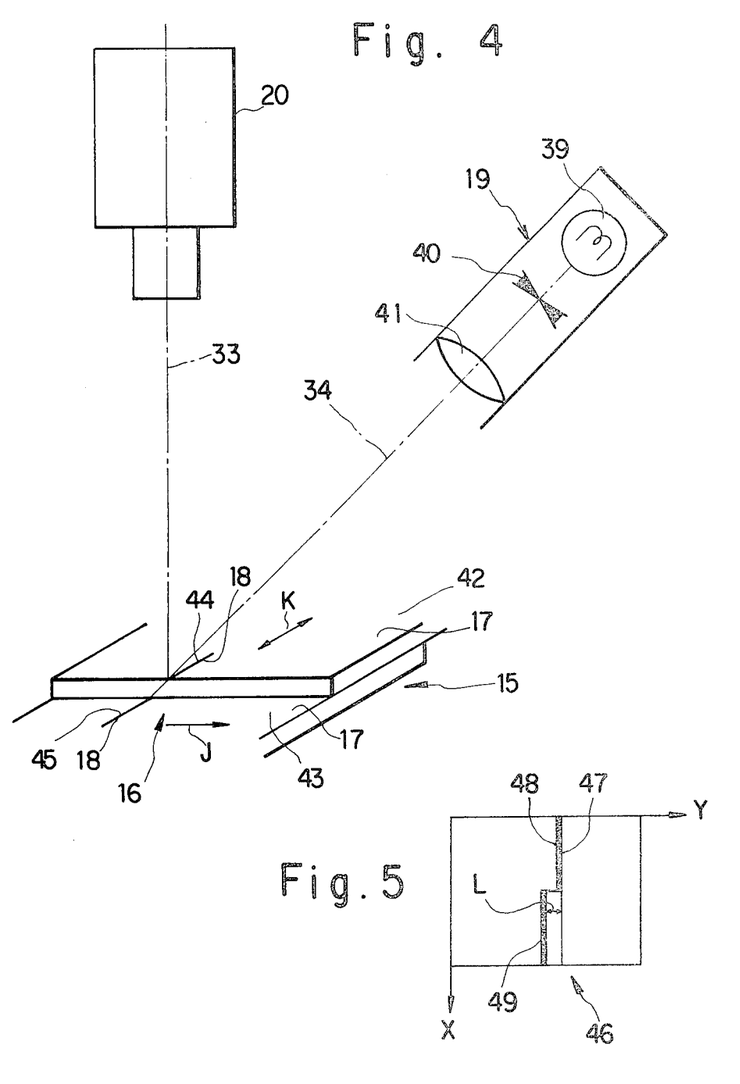
FIG. 4 is an explanatory view for the optical cutting method employed in the industrial robot shown in FIG. 1.
FIG. 5 is an explanatory view for the images picked-up by the method shown in FIG. 4.

Before explaining the constitution and the operation of the robot in details, reference is at first made to the optical cutting method for detecting the configuration of the work surface 17 and the position of the stepped portion 16 by the use of the slit light source 19 and the television camera 20 in conjunction with FIG. 4 and FIG. 5.

FIG. 4 and FIG. 5 are explanatory views for the inspection of the configuration of the work surface 17 to be inspected by way of the optical cutting method, in which the slit light source or slit image projector 19 comprises a light source 39, a slit forming means 40 and a lens 41 that forms slit images on the work surface 17 to be inspected. The slit images 18 are formed on the inspected surface 17 by the projector 19. The optical axis 34 of slitwise light from the projector 19 is oblique to the inspected surface 17 and the slit images 18 contain two image parts 44, 45 formed on the inspected surface 17 of an upper member 42 and a lower member 43 at the stepped portion 16. The photoreceiving optical axis 33 of the television camera 20 is vertical to the inspected surface 17. Accordingly, images 46 as shown in FIG. 5 are obtained on the screen of the camera 20 by aligning the extending direction J of the stepped portion 16 with the horizontal direction (axis Y) of the images 46 on the screen of the camera 20 and setting the longitudinal direction K of the slit images 18 in perpendicular to the extending direction J of the stepped portion 16. A fat line 47 of the camera images 46 represents video images consisting of luminous dots picked-up from the slit images 18 in which fat lines 48, 49 are video images consisting of luminous dots corresponding to the slit images 44, 45 respectively. The axis X represents the vertical direction of the video images 46. The video images 48, 49 for the image parts 44, 45 are displaced by a distance L in the horizontal direction, which shows the presence of the stepped portion 16 in the inspected surface 17, and which serves for deriving the position and the height of the stepped portion 16 (by using the oblique angle of the optical axis 34 to the surface 17 etc.).

It is not always necessary that the optical axis 33 is vertical to the inspected surface 17 and the optical axis 34 is oblique to the inspected surface 17 so long as the optical axes 33, 34 are oblique to each other.

Referring back to FIG. 1 to FIG. 3, the teaching operation comprises preparatory procedures of placing the work 15 to a predetermined position, setting the reversible motor 27 to its initial position, setting the distance H between the brackets 11 and 13 to the initial distance $H_0$, arranging the axial line 14 in parallel with the seal line 16, aligning the top end 35 of the nozzle 37 with the seal poriton 16 so that the optical axis 34 is situated in front of the sealing direction J while the nozzle 37 is situated behind the sealing direction J, and positioning the optical axis 33 so as to be in perpendicular to the work surface 17. Thereafter, the top end or tip 35 of the nozzle 37 is displaced in the direction J to trace the seal portion 16 while keeping the distance H to $H_0$ and keeping the predetermined positional relation of the optical axes 33, 34 and the nozzle 37 to the seal line 16. The positions for the arm 3 in this situation are successively stored as the teaching data e in the memory unit 10. The teaching system may be point-to-point teaching or continuous teaching.

FIG. 6(a)–(e) show seal poritons in various forms such as over-laying seal 50a, under-laying seal 50b, abutted seal 50c, V-grooved seal 50d and upward-apertured seal 50e. If the light source 19, the camera 20 and the nozzle 37 are positioned accurately relative to the work surface as in the time of the teaching operation, then slit images as shown in 51a, 51b, 51c, 51d, 51e are obtained respectively on the screen of the camera 20. An arrow M represents the direction of the optical axes 33, 34, references 52 represents the seal portion and reference 53 represents the images picked-up from the seal portion.

Figure 7:
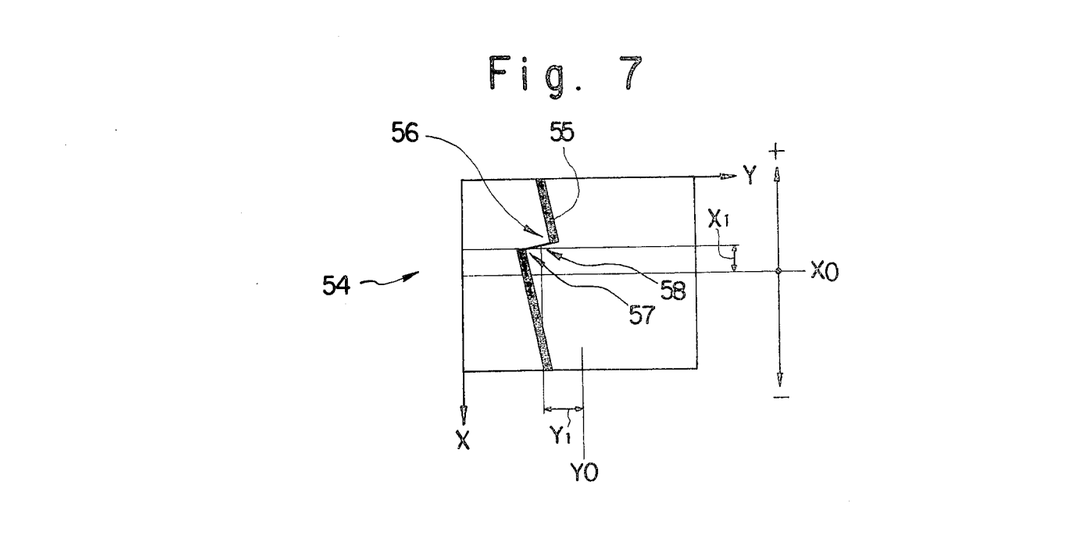
FIG. 7 is an explanatory view for the slit images where the top end of the nozzle is away from the seal line.

Upon playback operation, if the position for the work 15 having the over-laying seal portion 16 or the position for the top end 9 of the wrist of the robot main body is displaced from the predetermined position specified upon teaching, the position between the nozzle top end 35 and the seal line 16 is displaced to produce images 54 such as shown in FIG. 7 on the screen of the camera 20. In the camera images 54, the positional deviation between the nozzle top end 35 and the seal line 16 is expressed by the deviation $+X_1$ of the video images 57 for the seal line, which are shown at the left end of the flexed portion 56 of the video images 55 picked-up from the slit images, from the center position $X_0$ relative to the vertical direction (direction X) in the camera screen (approximately corresponding to the position of the nozzle top end 35) and the extent of the deviation $+X_1$ is detected by a video image processing device.

The leftward horizontal deviation $Y_1$ of the thin center line 58 in the flexed portion 56 of the camera images 54 from the center position $Y_0$ of the screen indicated that the nozzle top end 35 is displaced toward the member 43 on the work surface 17, and the slanting of the video images 55 to the screen indicated that axial line 14 is slanted to the seal line 16.

The deviation of the nozzle top end 35 in the working assembly from the seal line 16 as the portion to be worked is detected by the slit image projector 19 and the television camera 20 secured to the bracket 13, as well as by an image processing device including a video signal processing device 59 having the constitutions to be described later.

Figure 8:
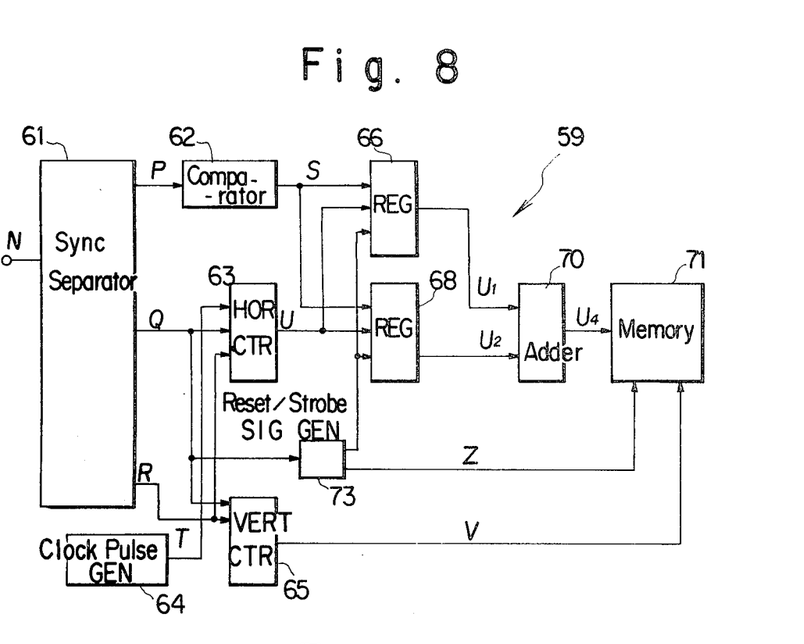
FIG. 8 is a block diagram for the video signal processing device as a preferred embodiment applied to the industrial robot shown in FIG. 1.
Figure 9:
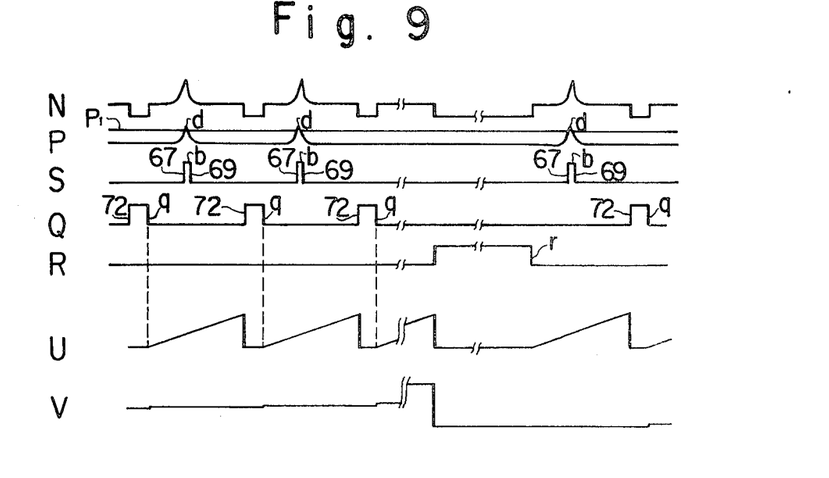
FIG. 9 is a graph showing time-dependence of various signals appearing in the video signal processing device shown in FIG. 8.

FIG. 8 shows a block diagram for the video signal processing device 59. A synchronization separation circuit 61 receives, from camera 20, composite video signals N and issues at its output, signals N as video signals P, horizontal synchronization signals Q and vertical synchronization signals R while separating them from each other. The video signals P are electrical signals having amplitude corresponding to the bright and dark pattern on the camera screen obtained by scanning the electrical images 54. The horizontal synchronization signals Q comprise horizontal synchronization pulses q which are issued upon completion of a stroke of the horizontal scanning and transfer to the succeeding horizontal scanning. The vertical synchronization signals R comprise vertical synchronization pulses r which are issued upon completion of scanning for one frame.

A binarization circuit 62, which receives the video signals P, determines whether the amplitude of the video signals P is greater than a specified threshold value $P_1$ or not, and outputs binarized bright and dark luminous signals S either at a high level if above the threshold value $P_1$ or at a low level if below the threshold value $P_1$.

The threshold value $P_1$ is set by determining the average level of the video signals P in the case where no horizontal and vertical synchronization pulses q, r are produced and adding a predermined amplitude (voltage) to the average level. Undesired effects resulted from the fluctuations in the background level due to the changes in the brightness over the entire inspected surface 17 can be eliminated by the comparison between the amplitude of the video signals P and the threshold value $P_1$.

In order to avoid the effects of optical noises or electrical noises including the depositon of dusts to the camera 20, lens 41 and the like, a low path filter may be provided to the video input or output of the synchronization separation circuit 61 for eliminating the fluctuations in the amplitude of the video signals P at a time interval corresponding to the width below that of the slit.

A horizontal counting circuit 63 as a first counting circuit comprises a 8 bit binary counter, for example, in the case of dividing the horizontal direction (direction Y in the video image 54) into 256 sections at the maximum, and the contents U in the counting circuit 63 are reset to zero on every reception of horizontal synchronization pulses q or the vertical synchronization pulses r from the synchronization separator 61. The horizontal counting circuit 63 receives clock pulses T from a clock pulse generation circuit 64 and counts the number of the clock pulses. Specifically, the counted values U in the horizontal counting circuit 63 correspond to the horizontal position Y on the electrical or video images 54. The oscillation frequency in the generation circuit 64 is changed in accordance with the number of divisions in the horizontal direction (resolution). For instance, the video image 54 are divided about in 200 sections for the oscillation frequency of about 4 MHz and in about 245–250 sections for the oscillation frequency of 5 MHz.

A vertical counting circuit 65 as a second counting circuit comprises a 9 bit binary counter which counts the number of horizontal synchronization pulses q produced from the separation synchronization circuit 61 and stores the counted values V (the number of bits is determined by the number of horizontal synchronization pulses), and the contens V in the counting circuit 65 are reset to zero by the vertical synchronization pulses r. That is, the counted values V in the vertical counting circuit 65 correspond to the vertical position X on the video images 54.

A register 66 comprising a D type flip-flop receives and holds the contents $U_1$ in the horizontal counting circuit 63 when the uprising portion, that is, the leading edge 67 of the pulse b that constitutes the output S from the binarization circuit 62 arrives at the register 66.

Another register 68 receives and holds the contents $U_2$ in the horizontal counting circuit 63 when the falling portions, that is, the trailing edge 69 of the pulse a arrives at the register 68.

A 9 bit binary full adder 70 adds the contents $U_1$ in the register 66 and the contents $U_2$ in the register 68 and stores the summed data $U_3$. Accordingly, the additon circuit comprises the register 68 and the adder 70.

A memory device 71 stores the contents $U_4$ for the upper 8 bits of the contents $U_3$ in the adder 70 into the address W corresponding to the contents V in the vertical counting circuit 65. The contents $U_4 = U_3/2 = (U_1 + U_2)/2$ correspond to the center position of the pulse b, that is, approximately to the center position of the bright and dark luminous information pulse d of the video signals P. The address W represents the position X of the video images 54 in the vertical direction (that is in the direction of axis X) in the slit images 55 and the contents $U_4$ in the address W represent the horizontal position Y of the video images 54 for the central bright dots in the slit images 55. Accordingly, in the video signal processing device 59, the slit image position in the horizontal direction Y (central position) is given by 1 byte of memory capacity and the images, for example, constituting of 256×256 image dots can be stored in 256 bytes (decreased to 1/32 in the conventional capacity). In addition, since the memory address and the data stored in the address, directly give the configuration of the slit images, that is, the configuration of the inspected surface including the seal portion, the post-processing time required for determining the deviation $X_1$ or $Y_1$ and delivering the signals g indicating the deviation (FIG. 10) can be decreased to remarkably shorten the image processing time. It is not always necessary to maintain the relation: W=V so long as 1:1 correspondency is kept between the contents in the addreess W and the contents V in the circuit 65 and index modification may be effected for instance. The timing for writing the data V into the memory device 71 is controlled by a timing circuit 73 that operates upon the uprising or leading edges 72 of the horizontal synchronization pulses q, in which the timing circuit 73 applies a write strobe signal Z to the memory device 71 upon arrival of the leading edge 72 of the pulse q to the timing circuit 73 thereby causing the memory device 71 to store the data $U_4$ from the adder 70 in the address W and, thereafter, resets the contents $U_1$, $U_2$ in the registers 66, 68 to zero.

Since the address W in the memory device 71 and the data $U_4$ stored in the address express the bright dots, that is, the video information for the slit images 55 in the video signal processing circuit or device 59 and the image processing device containing the same, the memory capacity in the memory device 71 can be saved, as well as the direct information for the configuration of the inspected surface can be prepared simultaneously in the course of storing the bright dot data to thereby significantly shorten the video or image processing time.

Referring back to FIG. 1 to FIG. 3, the deviation $X_1$, $Y_1$ of the nozzle top end 35 from the seal line 16 is adjusted by rotationally displacing the nozzle 37 together with the light source 19 and the camera 20 around the axis 14 in the direction G by the rotation of the motor 27.

Figure 10:
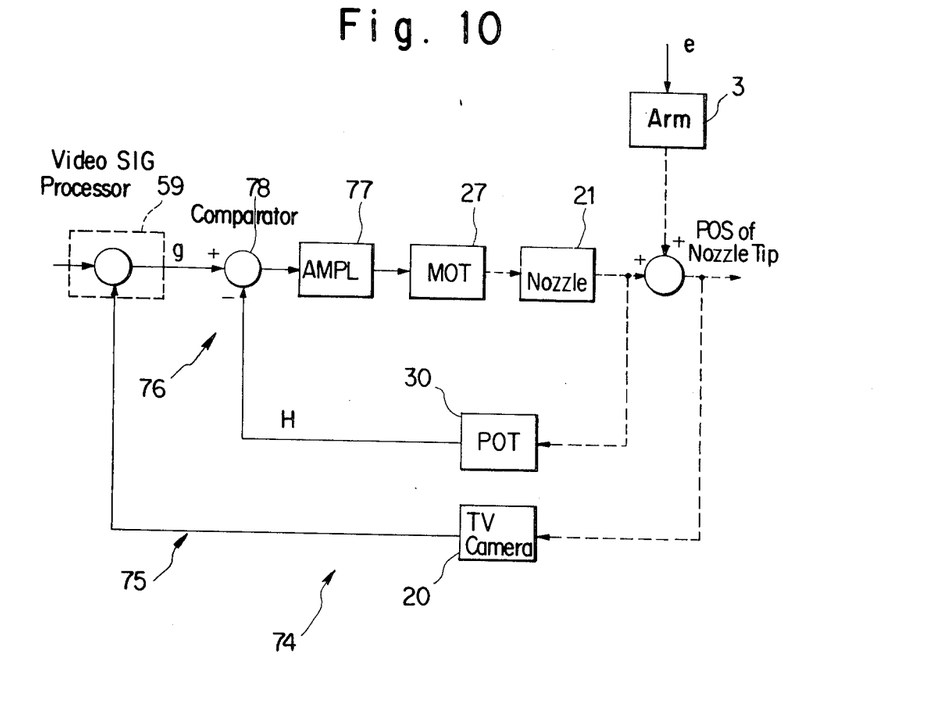
FIG. 10 is a block diagram for the correction control mechanism applied to the robot shown in FIG. 1.

Explanation is to be made to a correction control mechanism including the video signal processing device 59 for the foregoing adjustment upon playback operation referring to FIG. 10.

The correction control mechanism 74 has two feedback control loops 75, 76 in which a large loop 75 conducts the basic positioning with high accuracy for the nozzle top end 35 to the seal line 16 and the positioning can be made more rapidly and accurately by the combined use of the small loop 76 to the large loop 75. In the loop 75, the position of the arm 3 or the position of the wrist top end 9 is determined based on the teaching data e. Upon start of the playback operation, since the distance H equals to the distance $H_0$, the initial position f of the nozzle tip 35 based on the position of the arm 3 is determined on the data e.

The relative position of the nozzle top end 35 to the seal line 16 where the top end 35 is at the position f is picked-up by the camera 20 paired with the slit optical source 19. If the deviation is found to be present between the top end 35 and the seal line 16 based on the picked-up images, the direction and the extent of the deviation are determined in the video signal processing device 59 and the deviation signal is produced as the data g expressing the necessary compensation amount from the processing device 59. The data g is sent by way of a servo amplifier 77 to the motor 27. The amplifier 77 rotates the motor 27 in a predermined direction based on the data g to thereby displace the nozzle top end 35 of the working assembly 21 to the seal line 16. The relative position, that is, the deviation of the top end 35 to the seal line 16 due to the displacement of the top end 35 is picked-up by the cameral 20. The presence of absence, the direction and the extent of the deviation $X_1$ from the reference position are detected again in the processing device 59 based on the picked-up images and the feedbacking operation is conducted in the loop 75 until the top end 35 coincides the seal line 16.

In the operation speed for the compensation in the loop 75 is sufficiently high as compared with the moving speed of the nozzle top end 35, that is, the seal operation speed in the seal line direction J, the position for the top end 35 can be compensated, in fact, during sealing operation only by the loop 75 so that the top end 35 may be always moved along the seal line 16. Such a way of compensation is enabled, because the degree of freedom in the nozzle top 35 to the wrist top end 9 is decreased, as well as because the position of the arm 3 relative to the platform 2 is controlled by the teaching data e and the position of the nozzle top end 35 is controlled independently from the arm 3 so as to compensate the deviation $X_1$ of the nozzle top end 35 to the actual working line 16. However, even if the time ($t_1$) required for recognizing the video image pattern for the slit images based on the data $U_4$ stored in a series of addresses W in the memory device 71 simultaneously with the scanning for the electrical images and detecting the deviation ($X_1$) by the video signal processing 59 increased to a high processing speed is sufficiently small as compared with the sampling time interval ($t_0$) for the images in the processing device 59 (for instance 1/50 or 1/60 sec. in the case or raster scanning without interlacing), it is still necessary to take a correction control for the compensation of the deviation $X_1$ at least in each time period ($t_0$-$t_1$). Such a compensation control is attained by the small feedback loop 76 in the correction mechanism 74.

That is, when the correction data g to the images for one sampling is produced from the device 59, the data g is once held in a comparator 78. The motor 27 is rotated by way of the amplifier 77 based on the correction data g held in the comparator 78 and the top end 35 of the working assembly 21 is moved to the seal line 16. The displacement of the nozzle tip 35 relative to the wrist top end 9 is detected as the change in the distance H between the brackets 11 and 13 by the potentiometer 30 as a detection means for the relative position and the comparator 78 compares if the change in the distance H corresponds to the data g.

The comparator 78 holds the present detection value $H_1$ of the potentiometer 30, for example, on every input of new correction data g as the deviation signal from the device 59, and prepares a difference h for the distance data $H_1$ and the distance data $H_2$ between the brackets 11 and 13 produced newly from the potentiometer 30 in accordance with the displacement of the nozzle top end 35 to the seal line 16 ($H_2 = H_1$ at the time the correction data g is produced from the processing device 59), and compares if the difference h corresponds to the data g or not. The response in the loop 76 can be made much quicker as compared with the processing speed in the processing device 59 and the seal operation speed, the nozzle top end 35 can actually be displaced rapidly to the position specified by the processing device 59. When the correction data based on the next sampling for the images is produced from the processing device 59, the loop 76 responds at a high speed to displace the top end 35 based on the correction data g. The foregoing processions are repeated and, as the result, the nozzle top end 35 can be moved along with the seal line 16 at high accuracy upon playback operation, whereby accurate sealing operation is enabled.

The industrial robot with the foregoing constitutions has the following advantages:

(1) The erros introduced in the moving trace upon playback operation can be reduced less than a certain level of a predetermined error defined by the correction mechanism, irrespective of the errors in the teaching operations, error in the work positioning and error due to the repeating operation of the robot.

(2) Compensation can be attained in a usual robot having 6 degree of freedom with no sensor by merely providing the robot wrist with the movable working assembly and the detection and control means for the position of the working assembly.

(3) Since the present system does not rely on the correction of the robot status (arm position) based on the sensing result, it requires no coordinate conversion thus making it unnecessary to have high speed processing function and a great amount of programs for the coordinate conversion.

(4) Since the object to be detected by the sensor is restricted only to the distance from the seal line to the top end of the sealing nozzle, the processing time for the sensed results can be shortened.

(5) Since the images forming templates are not memorized upon teaching operation, the capacity of the memory can be decreased. If it is required to store the slit images depending on the case, the memory capacity only has to be increased by 3 bits per one teaching point (for example, in the case up to 8 patterns)

For displacement of the nozzle top end 35 of working assembly 21 in order to correct the position thereof, it is not always necessary to rotationally displace the top end around the axis 14 but, instead, the brackets 11 and 13 may be connected by way of a hydraulic cylinder comprising a piston and a cylinder and the bracket 13 may be displaced linearly or horizontally to the bracket 11. Further, the displacing direction is not necessarily be unidirectional but a hydraulic cylinder may be provided between the base 22 of the working assembly 21 and the nozzle top end 35 so as to enable the nozzle top end 35 to reciprocate to the work surface 17. For instance, the working assembly 21 comprising the nozzle 37, the nozzle holder 38 and the rigid base 22 shown in FIG. 1 to FIG. 3 can be replaced, for example, with an improved working assembly 79 suitable to sealing operation in which the top end 35 of the sealing nozzle is not possibly forced intensely to the work surface 17, sealing for the corners can be carried out with ease and a nozzle can be held in a predetermined configuration in the case where the force applied from the work 15 to the nozzle top end 35 in the direction perpendicular to the longitudinal direction of the nozzle (lateral direction) is below a predetermined value.

Figure 11:
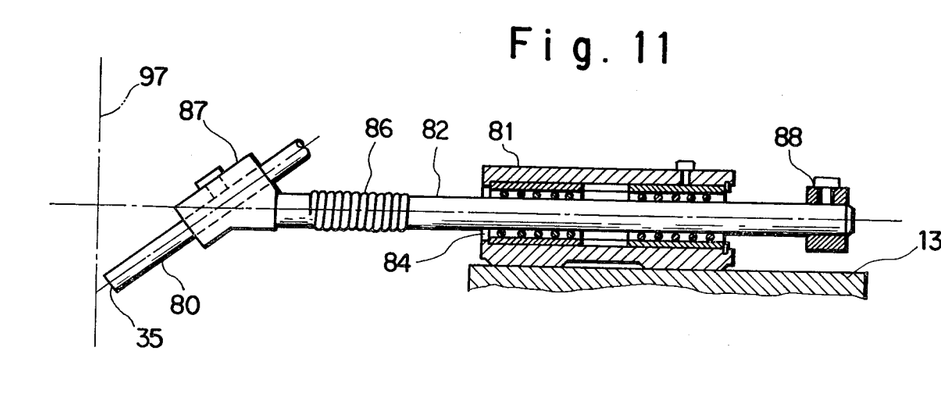
FIG. 11 and FIG. 12 are explanatory views for the modified embodiment of the working assembly applied to the industrial robot shown in FIG. 1.
Figure 12:
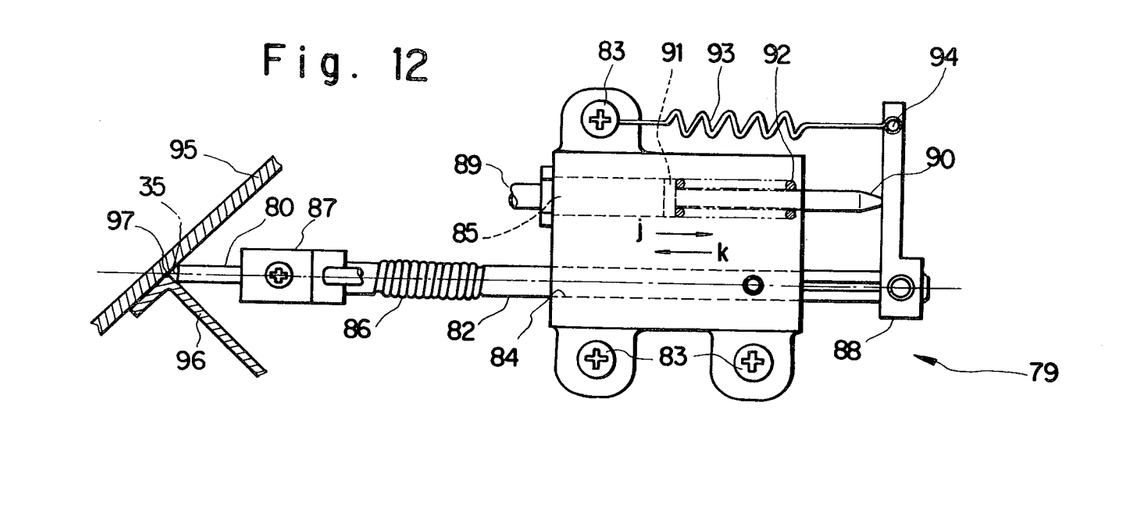
Figure 13:
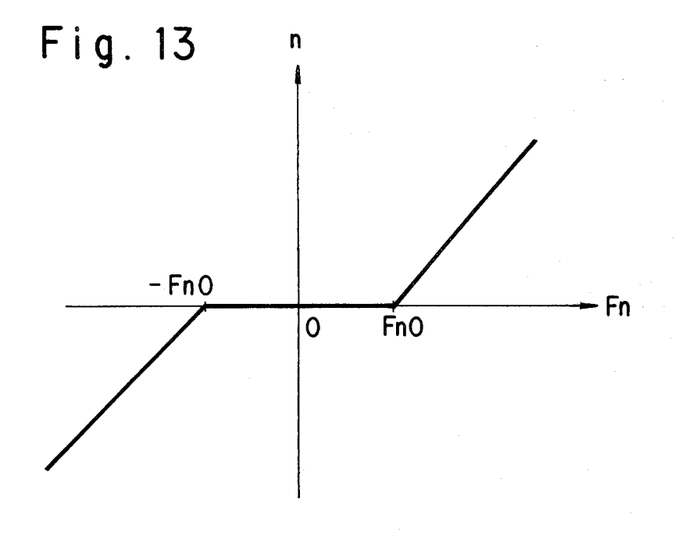
FIG. 13 is a graph showing the characteristics of the close contact helical coil spring used in the working assembly shown in FIG. 11 and FIG. 12.

The working assembly 79 shown in FIG. 11 and FIG. 12 comprises a sealing nozzle 80 and a holder 81 for a movable shaft 82 connected to the sealing nozzle for holding the same. The holder 81 for the movable shaft 82 is secured to the bracket 13 by means of a screw 83. The holder 81 is formed with an aperture 84 through which the movable shaft 82 passes slidably and an aperture 85 made in parallel with the aperture 84 for an air cylinder. The cylinder means 85 is integrated with the holder 81. A flexible close contact coil spring 86 connects the one end of the movable shaft 82 and a nozzle mounting portion 87. A connection rod 88 is connected at its one end to the other end of the movable shaft 82. An air pipeway 89 is communicated with the aperture 85 and a push rod 90 is abutted at its one end against the rod 88 so as to apply the force in the direction j to the center position of the rod 88 in accordance with the air pressure introduced into the cylinder aperture 85 by way of the air pipeway 90. The push rod 90 is formed at the other end thereof with a piston 91 moving slidably in the directions j and k while in contact with the cylinder aperture 85 in an air tight manner. A spring 92 is mounted between the holder 81 and the piston 91 for returning the push rod 90 to the cylinder aperture 85 in the direction k where the air pressure is removed. A coil spring 93 acting as a resilient member is mounted between the holder 81 and the other end of the rod 88 for returning the rod 88 by way of a pin 94 in the direction k. The close contact coil spring or densely wound helical spring 86 is usually in a linear configuration along the longitudinal direction m and, in fact, kept at this linear state in a case where the force Fn exerted on the nozzle top end 35 in the direction perpendicular to the longitudinal direction m is smaller than $Fn_0$, and is bent in a case where the force Fn is greater than $Fn_0$ approximately in proportion to $(Fn-Fn_0)$ as shown in FIG. 13.

Figure 14:
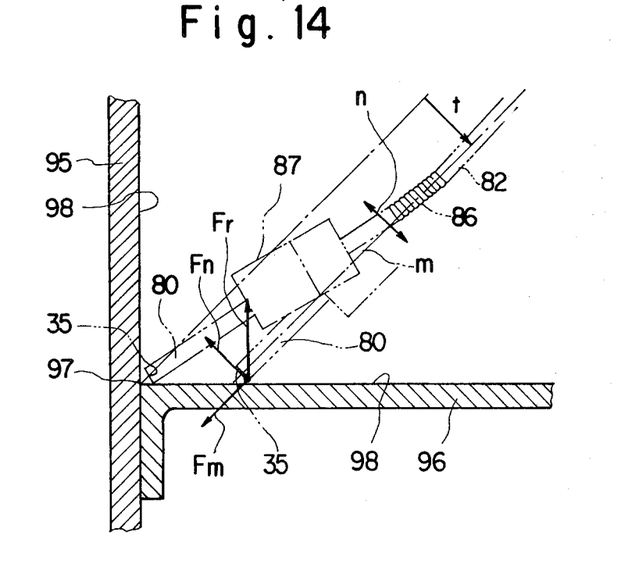
FIG. 14 is an explanatory view for the working assemblies shown in FIG. 11 and FIG. 12.

In a case where sealer material (such as urethane, rubber or silicone adhesives) is applied to the welding seam 97 between the steel plates 95 and 96 by using the working assembly 79 for sealing in the playback operation, the top end 35 of the nozzle 80 is abutted against the seam, that is, the seal line 97 between the steel plates 95 and 96.

Figure 6:
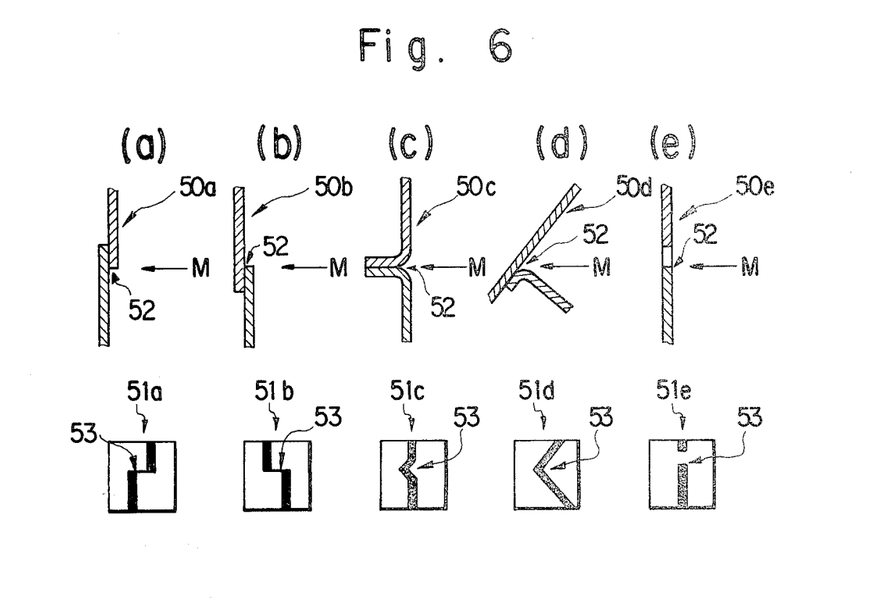
FIGS. 6(a) to (e) are explanatory views for various seal portions and the slit images for each of the seal portion obtained by the method shown in FIG. 4.

The close contact coil spring 86 of the working assembly 79 is usually in a linear configuration and the top end 35 of the nozzle 80 is forced at a certain force Fm by the compression strength of the coil spring 93 against the surface 98 of the steel plates 95 or 96 where the arm 3 of the robot main body 1 and the plates 95, 96 are at predetermined positions. In the case where the nozzle top end 35 is just positioned to the seal line 97 or in contact with the surface 98 near the seal line 97, since the reaction force Fr given from the surface 98 to the nozzle top end 35 is small and the magnitude of the force $|Fn|$ exerted in the direction n to the nozzle top end 35 is smaller than $Fn_0$, the coil spring 86 is kept linearly. However, in the case where the deviation from the nozzle top end 35 to the seal line 97 is large, since the nozzle top end 35 is intensely forced against the surface 98, the force Fn is greater than the force $Fn_0$, whereby the coil spring 86 is bent. In this case, the movable shaft 82 and the nozzle 80 can be pushed out in the direction k by the compression force of the spring 93 so that the nozzle top end 35 may be displaced toward the seal line 97. Accordingly, in the sealing operation for the corners or the likes, the positional displacement of the nozzle top end 35 can be compensated to some extent with no damages to the nozzle top end 35 and the works 95, 96 in a range where the deviation t is relatively small between the nozzle top end 35 and the seal line 97. For sealing those portions other than corners (for example, the over-laying portions between the steel plates as shown in FIG. 6(a) and (b)), the sealing operation can be conducted within a range where the close contact coil spring 86 is not bent by taking the distance between the sealing work surface 17 and the bracket 13 longer to thereby decrease the pushing force Fm given from the coil spring 93 to the nozzle 80.

It will be apparent that the industrial robot explained above is not necessarily limited to the use of sealing work but can be applied also as other industrial robots requiring high accuracy by modifying the constitutions adequately in the working assembly.

While the foregoing explanation has been made for the embodiment where the platform 2 of the robot main body 1 is held stationary on the floor 4, the platform 2 may be adapted to be axially movable to the floor 4.

Figure 15:
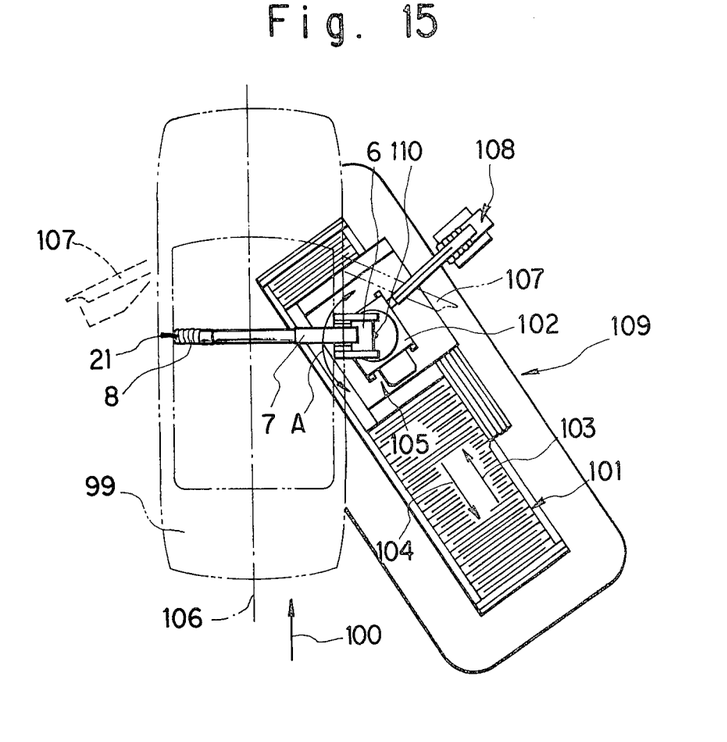
FIG. 15 to FIG. 17 are explanatory views for the modified embodiment of an industrial robot.
Figure 16:
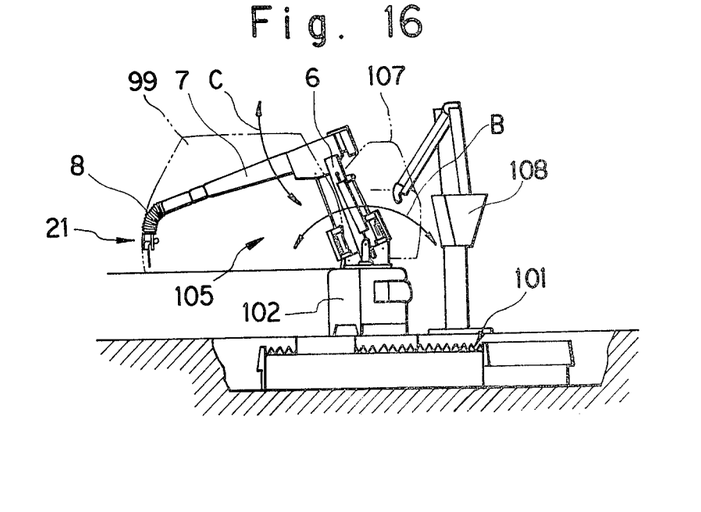
Figure 17:
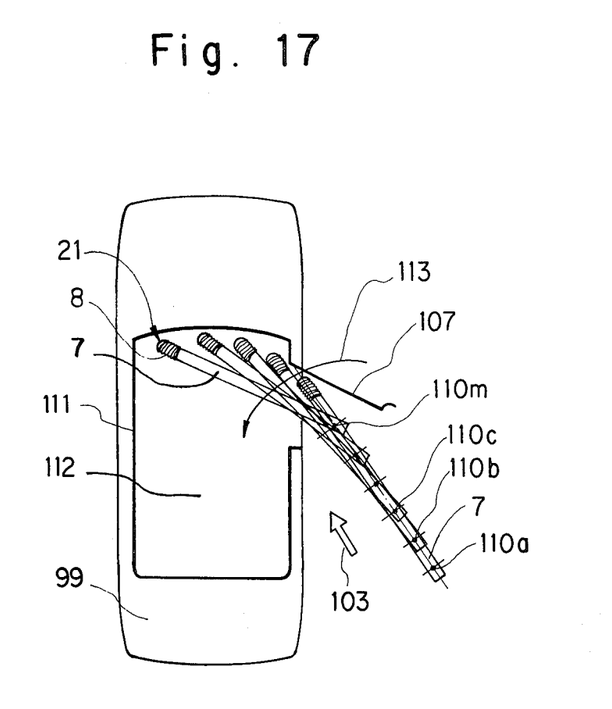

In FIG. 15 to FIG. 17, a car body 99 as a work or workpiece is transported in the direction 100 by a conveying device and set to a predetermined position. A transfer device 101 capable of situating below the car body 99 at a predetermined position has mounted thereon a robot main body 105 whose platform 102 is movable in the directions 103 and 104. Other portions in the robot main body 105 are constituted in the same manner as in the robot main body 1. The working assembly 21 is not restricted only to the sealing work but it may be a working assembly for the interior work to a car body such as a coating nozzle and a welding torch.

The transfer device 101 is disposed so as to reciprocate the robot main body 105 in the direction 103, 104 relative to the car body 99, that is, in the direction crossing to the longitudinal axis 106 of the car body 99, and the robot main body 105 can be set at any desired position in the direction 103 and 104 by the transfer device 101. The car body 99 is rotatably provided with a door 107. At one side of transfer device 101 a door opening and closing robot 108 for the automatic opening and closure of the door 107 is provided.

In the industrial robot 109 having such a constitution, the robot main body 105 is retracted by the transfer device 101 in the direction 104 and set to a stand-by position in the case where the car body 99 is not yet positioned at a predetermined position. Then, when the car body 99 is transported by a conveyor in the direction 100 and set to the predetermined position, the door closing and opening robot 108 is actuated to rotate the door 107 and set it to an open position. Subsequently, the transfer device 101 is actuated to move the robot main body 105 in the direction 103. During movement, the rotational center 110 for the arm 7 transfers as 110a, 110b, ... as shown in FIG. 17. Assuming that a region 112 surrounded with a fat line 111 is the inside of the car body 99, the arm 7 is intially set in the direction along the direction 103 and, thereafter, successively rotates in the direction 113 around the rotational center 110 on a horizontal plane so that the working assembly 21 enters the predetermined region 112 as the arm 7 approaches the car body 99 upon movement in the direction 103 by the transfer device 101. This can prevent the working assembly 21 at the top end of the armpositions 7, 8 from abutting against the car body 99 to damage the car body. When the rotational center 110 comes to a point 110m which is nearest to the car body 99, the operation of the transfer device 101 is stopped, at which the platform 102 of the robot main body 105 is set stationary to conduct interior work by the robot main body 105. After the completion of the working in the work area 112, operation for each of the procedures mentioned above is conducted in the reversed manner to retract the robot main body 105 in the direction 104 and set it to the predetermined stand-by position. Thereafter, the robot 108 is actuated to move the door 107 to a closed position.

While the robot 109 is provided only on one side of the car body 99 in the embodiment referred to above, the robot may of cource be provided on both sides of the car body 99.

Since the platform 102 is provided movably so as to cross the longitudinal axis 106 of the car body 99 as the work in the industrial robot 109 mentioned above, the rotational center 110 of the arm 7 can be reciprocated and suitably brought nearer with ease to the car body 99 as the work, as well as the interior working can be conducted with ease.

What is claimed is:

1. A robot comprising a platform, a movable arm capable of moving with respect to the platform for operation based on information prestored in a memory, a working assembly movably connected to one end of the arm, means for the detection of the deviation between a position of the working assembly and a position of a portion of a workpiece to be worked, and means for displacing the working assembly relative to the arm to compensate for the deviation detected by the detection means, said working assembly comprising a holder member movable with respect to said one end of the arm, a movable shaft movably mounted on the holder member in the axial direction of the shaft, a coil spring secured at one end to one end of the movable shaft and being flexible in a direction perpendicular to the movable shaft, a sealing nozzle secured to the other end of the coil spring, a resilient member biasing the movable shaft toward the nozzle and having one end secured to the holder member, a connection rod rigidly connected at one end to the other end of the movable shaft and at its other end to the other end of the resilient member, a cylinder means integrally provided on the holder member, a push rod abutted at one end to a central portion of the connection rod and provided at its other end with a piston slidably engaging the cylinder means to displace the movable shaft toward the other end of the shaft by way of the connection rod when the pressure in the cylinder means increases, and a spring means mounted between the piston and the holder member so that the push rod is deeply engaged to the inside of the cylinder means when the pressure in the cylinder means decreases.

2. The robot according to claim 1, wherein the movable direction of the working assembly with respect to the arm is unidirectional.

3. The robot in any one of claim 1, in which the platform is movable to a support for the workpiece in the direction crossing the longitudinal axis of the workpiece and the movable arm is rotatably connected to the platform.

4. The robot of claim 3, in which the movable arm is rotatable to the platform within a horizontal plane.

5. The robot according to claim 1, wherein the detection means for the deviation comprises a slit image projector for projecting slit images on and around the portion of the work piece to be worked, an image pick-up means for repeatingly picking up the slit images on and around the portion of the workpiece to be worked and delivering composite video signals on every slit image picked up, and a video signal processing device for processing the composite video signals to detect the deviation between the position of the working assembly and the position of the portion of the workpiece to be worked and delivering a signal indicating the deviation.

6. The robot according to claim 5, wherein the displacing means comprises means for detecting the relative position of the working assembly to the arm, and means for displacing the working assembly relative to the arm by a distance corresponding to the magnitude of the deviation indicated by the deviation signals on every reception of the deviation signals from the video signal processing device based on a detection output from the detection means for the relative position upon reception of the deviation signals.

7. The robot according to claim 6, wherein the video signal processing device comprises a synchronization separation circuit for separating the composite video signals into video signals, horizontal synchronization signals, and vertical synchronization signals, and for delivering the separated signals, a binarization circuit for converting the video signals into binary signals of high and low levels depending upon luminous information contained in the video signals thus separated, a first counting circuit which is reset at least by one of the horizontal synchronization signals and the vertical synchronization signals and counts the number of clock signals, a second counting circuit which is reset by the vertical synchronization signals and counts the number of the horizontal synchronization signals, a register for storing contents in the first counting circuit upon generation of a leading edge in the binary signal from the binarization circuit, an addition circuit for adding contents in the first counting circuit upon generation of a trailing edge in the binary signal from the binarization circuit and the contents in the register, and a memory circuit for storing a data corresponding to a summed data calculated in the addition circuit into an address corresponding to the contents in the second counting circuit.

8. The robot in any one of claim 7, in which the addition circuit comprises a 9 bit binary full adder and the upper 8 bits in the summed data obtained in the adder are memorized in the memory circuit as the data.

9. A robot comprising a platform, a movable arm movably connected to the platform for operation based on information prestored in a memory, a working assembly movably connected to one end of the arm, means for detecting the deviation between a position of the working assembly and a position of a portion of the workpiece to be worked, said detecting means comprising a slit image projector for projecting slit images on the portion of the workpiece to be worked, an image pick-up means for repeatingly picking up the slit images on the portion of the workpiece to be worked and delivering composite video signals on every slit image picked up, and a video signal processing device for processing the composite video signals to detect the deviation between the position for the working assembly and the position of the portion of the workpiece to be worked and delivering a signal indicating the deviation, said video signal processing device comprising a synchronization separation circuit for separating the composite video signals into video signals, horizontal synchronization signals, and vertical synchronization signals, and for delivering the separated signals, a binarization circuit for converting the video signals into binary signals of high and low levels depending on the luminous information contained in the video signals thus separated, a first counting circuit which is reset at least by one of the signals of the horizontal synchronization signals and the vertical synchronization signals and counts the number of clock signals, a second counting circuit which is reset by the vertical synchronization signals and counts the number of the horizontal synchronization signals, a register for storing the contents in the first counting circuit upon generation of a leading edge in the binary signal from the binarization circuit, an addition circuit for adding contents in the first counting circuit upon generation of a trailing edge in the binary signal from the binarization circuit and the contents in the register, and a memory circuit for storing a data corresponding to the summed data calculated in the addition circuit into an address corresponding to the contents in the second counting circuit, and means for displacing the working assembly relative to the arm so as to compensate for the deviation detected by the detection means.

10. A robot comprising
- a plurality of arm portions movably connected with each other and movable so as to be successively positioned according to a sequence of information prestored in a memory;
- a working assembly connected to an end arm portion of said plurality of arm portions and movable with respect to the end arm portion;
- detecting means for detecting the position of the working assembly relative to a workpiece, said detecting means having an image pick-up means for repeatingly picking up pictures of a portion of a workpiece to be worked at regular intervals and including means for delivering a signal according to each picture, and a picture signal processing device for detecting deviations between the position of said working assembly and the position of the workpiece portion to be worked according to each picture signal and operable to develop a signal representing the deviation during a working operation when said plurality of arm portions are moved according to the prestored information and when said working assembly is carrying out the working operation on the workpiece for correcting the position of the working assembly relative to the workpiece; and
- displacing means for displacing said working assembly with respect to the end arm portion during the working operation, said displacing means having a detector for constantly detecting the position of the working assembly relative to the end arm portion, a comparator for constantly determining the difference between said last mentioned detected position and a target position on every reception of the deviation signals from the picture signal processing device based on a detection output from the detection means for relative position upon reception of the deviation signals, and a driving means for displacing said working assembly with respect to the end arm portion to reduce the difference obtained by the comparator; wherein
- said detecting means further comprises a pattern-projector for projecting a slit image on and around the portion of the workpiece to be worked during the working operation;
- the image pick-up means repeatingly picks up pictures of the slit image on and around the portion of the workpiece to be worked at regular time intervals and delivers a composite video signal as the picture signal for each picture of the slit image; and
- the picture signal processing device comprises a video signal processing device having a synchronization separation circuit for separating the composite video signals into video signals, horizontal synchronization signals, and vertical synchronization singals and for delivering the separated signals, a binarization circuit for converting the video signals into binary signals of high and low levels depending on luminous information contained in the video signals thus separated, a first counting circuit which is reset at least by one of the horizontal synchronization signals and the vertical synchronization signals and counts the number of clock signals, a second counting circuit which is reset by the vertical synchronization signals and counts the number of horizontal synchronization signals, a register for storing contents in the first counting circuit upon generation of a leading edge in the binary signal from the binarization circuit, an addition circuit for adding contents in the first counting circuit upon generation of a trailing edge in the binary signal from the binarization circuit and the contents in the register, and a memory circuit for storing a data corresponding to the summed data calculated in the addition circuit into an address corresponding to the contents in the second counting circuit.

11. The robot according to claim 10 wherein the addition circuit comprises a 9 bit binary full adder and the upper 8 bits in the summed data attained in the adder are memorized in the memory circuit as the data.

12. The robot according to claim 10 said working assembly being unidirectionally movably connected to the end arm portion.

13. The robot according to claim 10 wherein the robot has a platform movable with respect to a support of the workpiece in the direction crossing the longitudinal axis of the workpiece, and wherein said plurality of arm portions are rotatably connected to the platform.

14. The robot according to claim 13 wherein said plurality of arm portions are rotatable with respect to the platform within the horizontal plane.

15. A robot comprising
- a plurality of arm portions movably connected with each other and movable so as to be successively positioned according to a sequence of information prestored in a memory;
- a working assembly connected to an end arm portion of said plurality of arm portions and movable with respect to the end arm portion;
- detecting means for detecting the position of the working assembly relative to a workpiece, said detecting means having an image pick-up means for repeatingly picking up pictures of a portion of a workpiece to be worked at regular intervals and including means for delivering a signal according to each picture, and a picture signal processing device for detecting deviations between the position of said working assembly and the position of the workpiece portion to be worked according to each picture signal and operable to develop a signal representing the deviation during a working operation when said plurality of arm portions are moved according to the prestored information and when said working assembly is carrying out the working operation on the workpiece for correcting the position of the working assembly relative to the workpiece; and displacing means for displacing said working assembly with respect to the end arm portion during the working operation, said displacing means having a detector for constantly detecting the position of the working assembly relative to the end arm portion, a comparator for constantly determining the difference between said last mentioned detected position and a target position on every reception of the deviation signals from the picture signal processing device based on a detection output from the detection means for the relative position upon reception of the deviation signals, and a driving means for displacing said working assembly with respect to the end arm portion to reduce the difference obtained by the comparator; wherein the working assembly comprises a holder member movably connected to the end arm portion, a shaft movably mounted on the holder member in the axial direction of the shaft, a coil spring secured at one end to an end of the shaft and being flexible in a direction perpendicular to the shaft, a sealing nozzle secured to the other end of the coil spring, a resilient member for biasing the shaft toward the nozzle and having one end secured to the holder member, a connection rod rigidly connected at one end to the other end of the shaft and at its other end to the other end of the resilient member, a cylinder means integrally provided on the holder member, a push rod abutted at one end to a central portion of the connection rod and provided at its other end with a piston which slidably engages the sylinder means to displace the shaft toward the other end of the shaft by way of the connection rod when the pressure in the cylinder means increases, and a spring mounted between the piston and the holder member so that the push rod is deeply engaged in the inside of the cylinder means when the pressure in the cylinder decreases.

* * * * *